US012759601B2

(12) United States Patent
Lee et al.

(10) Patent No.: US 12,759,601 B2
(45) Date of Patent: Oct. 13, 2026

(54) TRANSPORT VEHICLE AND TRANSPORT SYSTEM INCLUDING THE SAME

(71) Applicant: SEMES CO., LTD., Chungcheongnam-do (KR)

(72) Inventors: Jun Beom Lee, Gyeonggi-do (KR); Dong Hoon Yang, Gyeonggi-do (KR); Yeong Jae Choe, Gyeonggi-do (KR); Sik Kim, Gyeonggi-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 23 days.

(21) Appl. No.: 18/963,645

(22) Filed: Nov. 28, 2024

(65) Prior Publication Data

US 2025/0178653 A1 Jun. 5, 2025

(30) Foreign Application Priority Data

Dec. 1, 2023 (KR) ........................ 10-2023-0172446

(51) Int. Cl.
*B61L 23/14* (2006.01)
*B60W 30/165* (2020.01)
*B61L 25/02* (2006.01)

(52) U.S. Cl.
CPC ........... *B61L 23/14* (2013.01); *B60W 30/165* (2013.01); *B61L 25/026* (2013.01)

(58) Field of Classification Search
CPC ..... B61L 23/14; B61L 25/026; B60W 30/143; B60W 30/165
See application file for complete search history.

(56) References Cited

U.S. PATENT DOCUMENTS

2019/0196456 A1* 6/2019 Oh ..................... G05B 19/4186
2024/0010250 A1* 1/2024 Otsuka ...................... B61B 3/02

FOREIGN PATENT DOCUMENTS

| | | |
|---|---|---|
| JP | 7173096 | 11/2022 |
| KR | 10-1425451 | 8/2014 |
| KR | 10-2513548 | 3/2023 |

* cited by examiner

*Primary Examiner* — Jacob M Amick
(74) *Attorney, Agent, or Firm* — WOMBLE BOND DICKINSON (US) LLP

(57) ABSTRACT

Provided is a transport system that controls a plurality of transport vehicles in a cooperative transport mode to transport a heavy load. The transport system includes: a first transport vehicle including a first driving wheel and configured to move by rotation of the first driving wheel; a second transport vehicle including a second driving wheel and configured to move by rotation of the second driving wheel; and an upper controller controlling the first transport vehicle and the second transport vehicle, wherein the upper controller provides a cooperative transport command to the first transport vehicle and the second transport vehicle, the first transport vehicle generates a position command according to the cooperative transport command, generates a first torque command based on the position command, and controls the first driving wheel based on the first torque command, and the second transport vehicle receives the first torque command and controls the second driving wheel based on the first torque command.

20 Claims, 9 Drawing Sheets

TRANSPORT VEHICLE AND TRANSPORT SYSTEM INCLUDING THE SAME

CROSS-REFERENCE TO RELATED APPLICATION

This application claims priority from Korean Patent Application No. 10-2023-0172446 filed on Dec. 1, 2023 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a transport vehicle and a transport system including the same.

2. Description of the Related Art

In a process of manufacturing semiconductor devices, substrates may be transported via an unmanned transport system. In particular, the unmanned transport system may include a transport vehicle (e.g., an overhead hoist transport (OHT), a rail guided vehicle (RGV), etc.) configured to be movable along a running rail installed on the ceiling or floor of a clean room. The operation control of the transport vehicle may be controlled by an upper controller such as an OHT control server (OCS) device.

SUMMARY

Aspects of the present disclosure provide a transport system that controls a plurality of transport vehicles in a cooperative transport mode to transport a heavy load.

Aspects of the present disclosure are not limited to the aspects mentioned above, and other aspects not mentioned will be clearly understood by those skilled in the art from the following description.

According to an aspect of the present disclosure, there is provided a transport system including: a first transport vehicle including a first driving wheel and configured to move by rotation of the first driving wheel; a second transport vehicle including a second driving wheel and configured to move by rotation of the second driving wheel; and an upper controller controlling the first transport vehicle and the second transport vehicle, wherein the upper controller provides a cooperative transport command to the first transport vehicle and the second transport vehicle, the first transport vehicle generates a position command according to the cooperative transport command, generates a first torque command based on the position command, and controls the first driving wheel based on the first torque command, and the second transport vehicle receives the first torque command and controls the second driving wheel based on the first torque command.

According to another aspect of the present disclosure, there is provided a transport vehicle comprising: a motion controller, a driver, a driving wheel, and a communicator, wherein in a first mode, the motion controller generates a position command, and the driver generates a first torque command based on the position command, and generates a first current for rotation of the driving wheel based on the first torque command, and in a second mode, the driver generates a second current for rotation of the first driving wheel based on a second torque command provided from the outside through the communicator.

According to still another aspect of the present disclosure, there is provided transport vehicle comprising: a motion controller, a driver, a driving wheel, and a communicator, wherein in a first mode, the motion controller generates a position command, and the driver generates a first torque command based on the position command, and generates a first current for rotation of the driving wheel based on the first torque command, and in a second mode, the driver generates a second current for rotation of the first driving wheel based on a second torque command provided from the outside through the communicator.

The details of other exemplary embodiments are included in the detailed description and drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
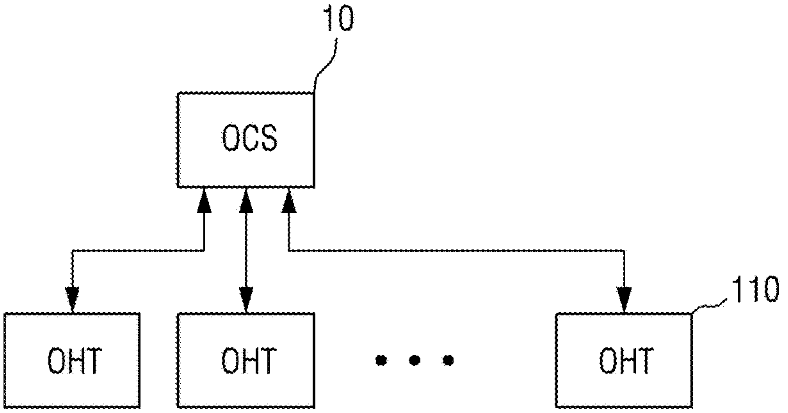
FIG. 1 is a conceptual diagram for describing a transport system according to some exemplary embodiments of the present disclosure.

Hereinafter, embodiments of the present disclosure will be described in detail with reference to the accompanying drawings. Advantages and features of the present disclosure, and a method for achieving the advantages and features will become apparent with reference to the exemplary embodiments described below in detail in conjunction with the accompanying drawings. However, the present disclosure is not limited to the exemplary embodiments disclosed below, but may be implemented in a variety of different forms, these exemplary embodiments will be provided only in order to make the present disclosure complete and allow those skilled in the art to completely recognize the scope of the present disclosure, and the present disclosure is only defined by the scope of the claims. The same reference numbers indicate the same components throughout the specification.

Spatially relative terms "below", "beneath", "lower", "above", "upper", and the like, may be used to easily describe correlations between one element or components and another element or components as illustrated in the drawings. The spatially relative terms are to be understood as terms including different directions of the elements at the time of use or operation in addition to directions illustrated in the drawings. For example, when an element illustrated in the drawing is turned over, an element described as being 'below or beneath' another element may be located 'above' another element. Therefore, an exemplary term 'below' may include both of directions of below and above. The element may also be oriented in other orientations, and thus spatially relative terms may be interpreted according to the orientation.

Terms "first", "second" and the like are used to describe various elements, components, and/or sections but these elements, components, and/or sections are not limited by these terms. These terms are used only in order to distinguish one element, component, or section from another element, component or section. Accordingly, a first element, a first component, or a first section mentioned below may also be a second element, a second component, or a second section within the spirit of the present disclosure.

Hereinafter, exemplary embodiments of the present disclosure will be described in detail with reference to the accompanying drawings. In describing the exemplary embodiments of the present disclosure with reference to the accompanying drawings, components that are the same as or correspond to each other will be denoted by the same reference numerals, and an overlapping description thereof will be omitted.

Figure 2:
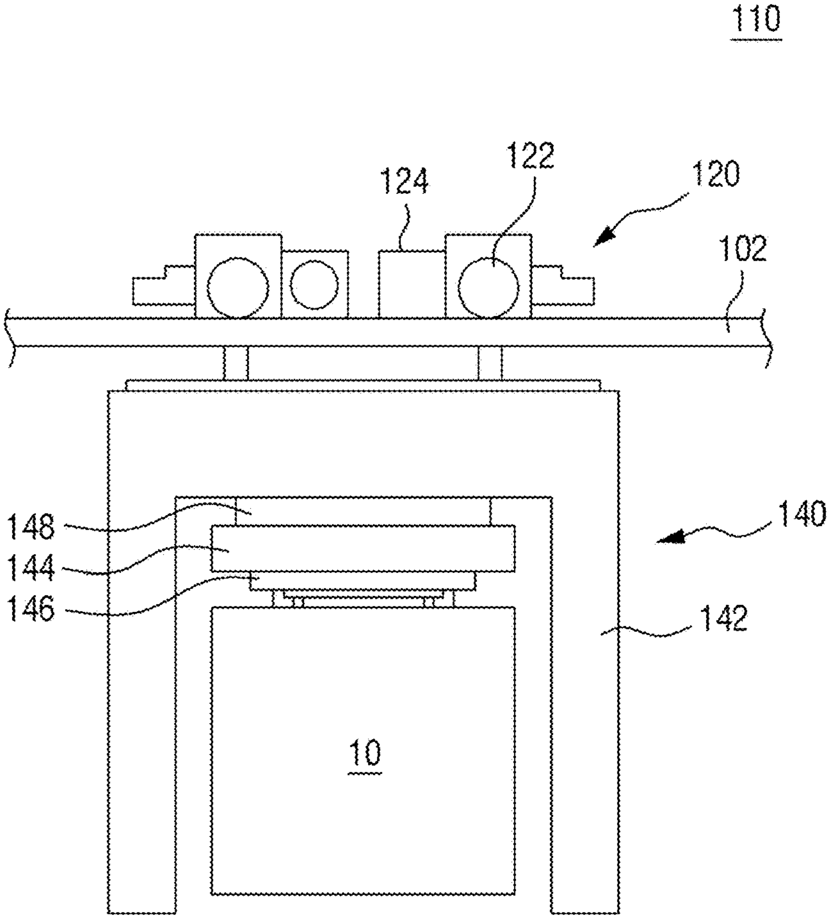
FIG. 2 is a diagram for describing a transport vehicle illustrated in FIG. 1.
Figure 3:
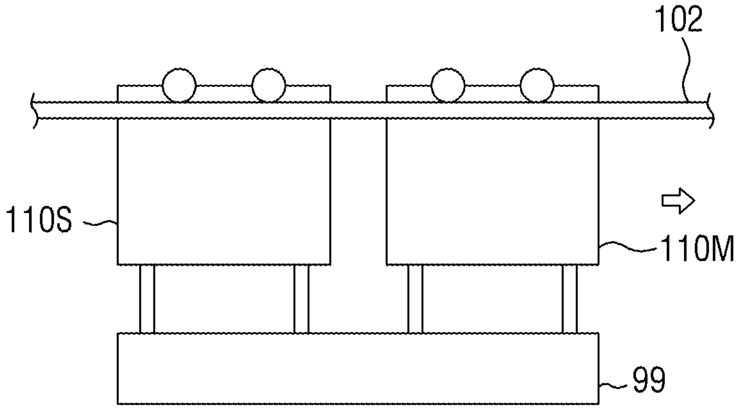
FIG. 3 is a diagram for describing an example of a plurality of transport vehicles transporting a heavy load.

FIG. 1 is a conceptual diagram for describing a transport system according to some exemplary embodiments of the present disclosure. FIG. 2 is a diagram for describing a transport vehicle illustrated in FIG. 1. FIG. 3 is a diagram for describing an example of a plurality of transport vehicles transporting a heavy load.

First, referring to FIG. 1, a transport system according to some exemplary embodiments of the present disclosure includes an upper controller (OHT control system (OCS)) 10 and a plurality of transport vehicles 110.

The transport vehicle 110 may be an overhead hoist transport (OHT) that runs along a rail installed on a ceiling of a semiconductor manufacturing plant (i.e., FAB), but is not limited thereto.

The upper controller 10 communicates with the plurality of transport vehicles 110, for example, through wireless communication, and controls the plurality of transport vehicles 110. The upper controller 10 provides a transport command to each transport vehicle 110. The transport command may include information such as a starting location (node A), a destination location (node B), and a transport target load (load C). The transport command may include a cooperative transport command in which the plurality of transport vehicles cooperate to transport the load, and a single transport command in which one transport vehicle transports the load.

Here, referring to FIG. 2, the transport vehicle 110 may transport a container 10, such as a front opening unified pod (FOUP) that stores wafers, while moving along a rail 102 within the semiconductor manufacturing plant.

Such a transport vehicle 110 includes a housing 142, a driving module 120, and a hoist module 140.

The driving module 120 is installed on the housing 142 and is installed to be movable along the rail 102. The driving module 120 includes a driving wheel 122 and a motor 124 for rotating the driving wheel 122. In the present specification, the "driving wheel" means at least one of a front driving wheel and a rear driving wheel, and the "motor" means at least one of a front motor that drives the front driving wheel and a rear motor that drives the rear driving wheel.

The hoist module 140 is installed in an internal space of the housing 142 ascends and descends while gripping the container 10.

The hoist module 140 may include a hoist unit 144 for ascending and descending the container 10, a slide unit 148 for moving the hoist unit 144 in a left and right direction, and a hand unit 146 connected to the hoist unit 144 and for gripping the container 10.

Referring again to FIG. 1, when the weight or size of the transport target load is difficult to transport with the single transport vehicle 110, the upper controller 10 may provide a cooperative transport command to the plurality of transport vehicles 110. That is, it is possible to instruct the plurality of transport vehicles 110 to cooperatively transport one heavy load.

For example, as illustrated in FIG. 3, a plurality of transport vehicles 110M and 110S moving along the rail 102 may cooperatively transport one load 99. When the plurality of transport vehicles 110M and 110S transport one load 99, a strong bonding is needed between the plurality of transport vehicles 110M and 110S to prevent the plurality of transport vehicles 110M and 110S from being separated from each other. This is because when mutual interference occurs between the plurality of transport vehicles 110M and 110S, the load 99 may fall.

Therefore, according to the transport system according to some exemplary embodiments of the present disclosure, when the plurality of transport vehicles 110M and 110S perform cooperative transport, one transport vehicle 110M among the plurality of transport vehicles 110M and 110S becomes a master vehicle, and the remaining transport vehicle 110S becomes a slave vehicle. The master vehicle controls an operation of the slave vehicle or participates in the operation of the slave vehicle.

In particular, the master vehicle provides a torque command to the slave vehicle (i.e., a torque control method), and the slave vehicle generates a current for rotation of the driving wheels based on the provided torque command.

The master vehicle does not participate in the operation of the slave vehicle by providing a position or speed command to the slave vehicle, but participates in the operation of the slave vehicle by providing the torque command to the slave vehicle. The master vehicle may selectively provide the position or speed command (for reference) to the slave vehicle while providing the torque command to the slave vehicle, but does not participate in the operation of the slave vehicle only with the position or speed command without the torque command.

When controlling the plurality of transport vehicles 110M and 110S using a position control method using the position command or a speed control method using the speed command, there may be mutually interfering forces between the plurality of transport vehicles 110M and 110S. That is, the torque within each of the transport vehicles 110M and 110S is not entirely used for movement (i.e., rotation of the driving wheels), and some of the torque may act as mutual interference that interferes the driving of other transport vehicles.

Figure 4:
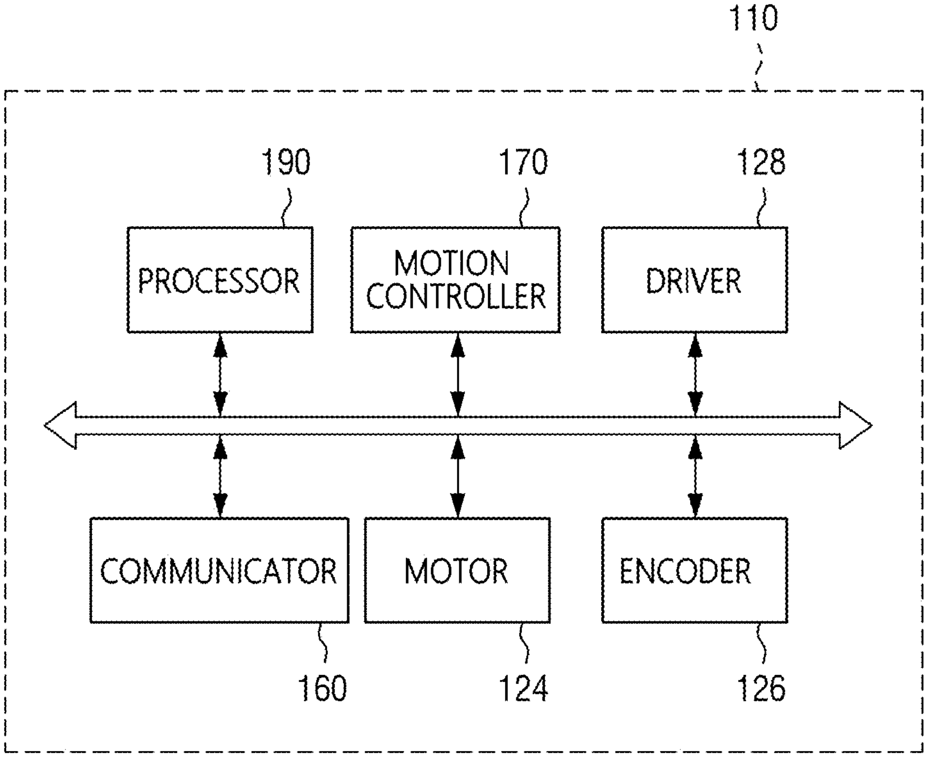
FIG. 4 is a block diagram for describing a transport vehicle according to some exemplary embodiments of the present disclosure.
Figure 5:
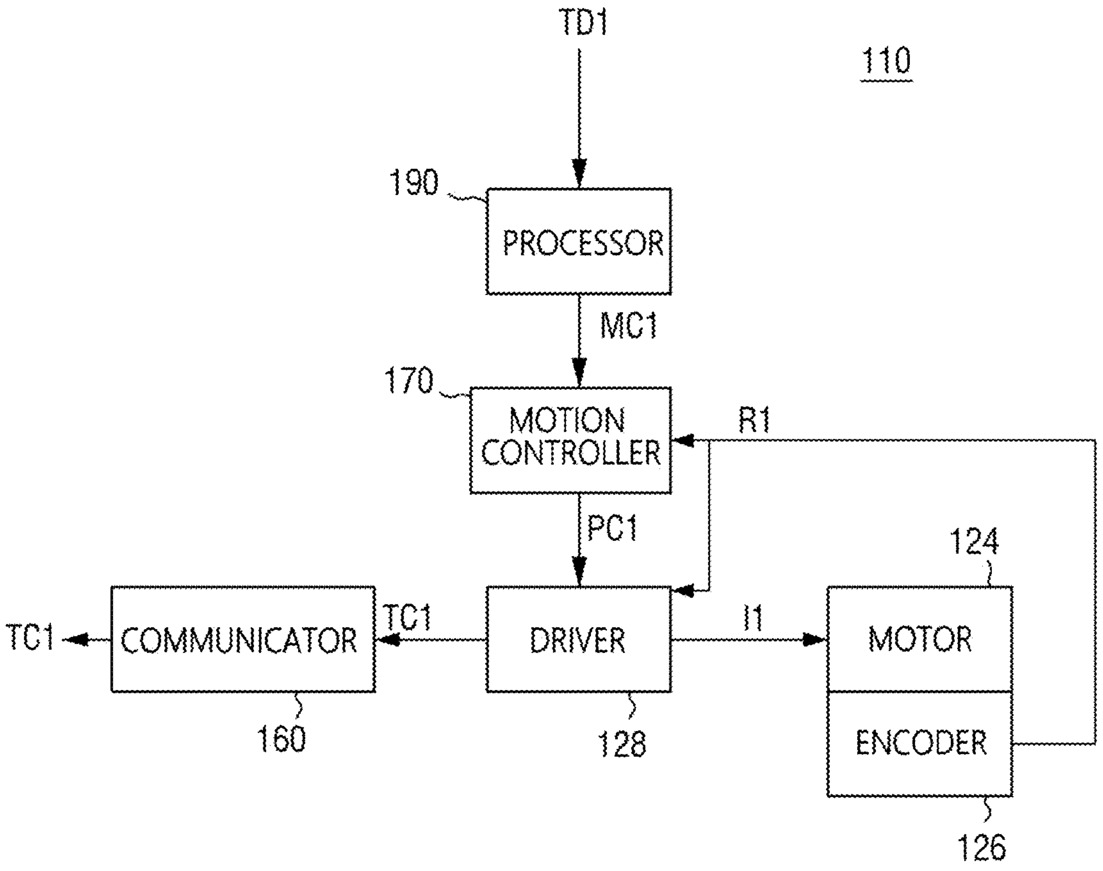
FIG. 5 is a block diagram for describing an operation when the transport vehicle of FIG. 4 is a master vehicle in a cooperative transport mode.
Figure 6:
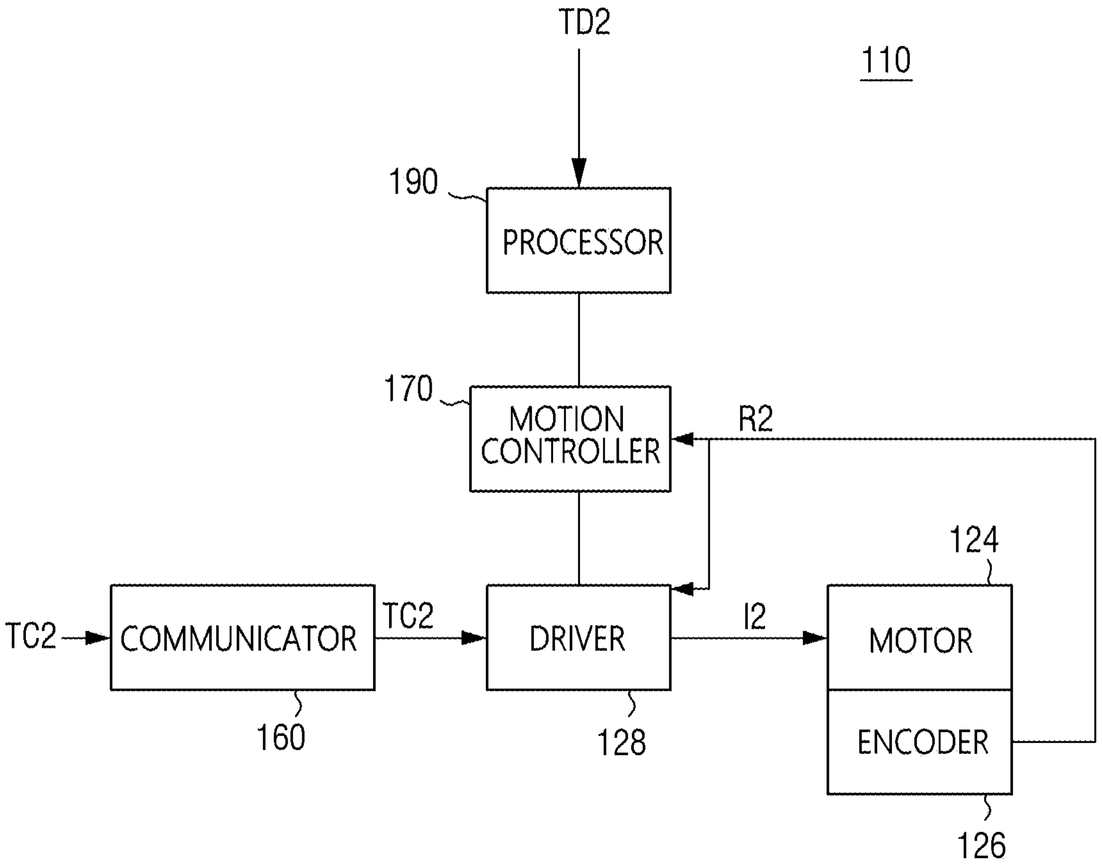
FIG. 6 is a block diagram for describing an operation when the transport vehicle of FIG. 4 is a slave vehicle in a cooperative transport mode.
Figure 7:
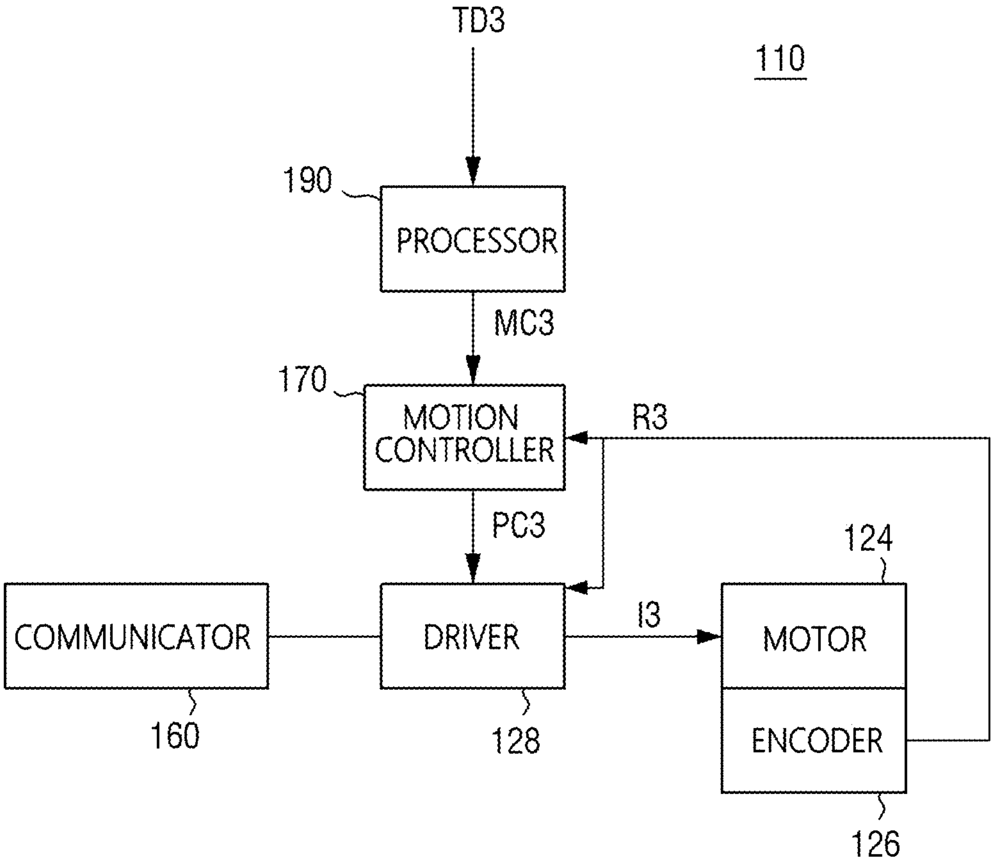
FIG. 7 is a block diagram for describing an operation when the transport vehicle of FIG. 4 is in a single transport mode.

FIG. 4 is a block diagram for describing a transport vehicle according to some exemplary embodiments of the present disclosure. FIG. 5 is a block diagram for describing an operation when the transport vehicle of FIG. 4 is a master vehicle in a cooperative transport mode. FIG. 6 is a block diagram for describing an operation when the transport vehicle of FIG. 4 is a slave vehicle in a cooperative transport mode. FIG. 7 is a block diagram for describing an operation when the transport vehicle of FIG. 4 is in a single transport mode.

First, referring to FIG. 4, the transport vehicle 110 includes a processor 190, a motion controller 170, a driver 128, a communicator 160, a motor 124, and an encoder 126.

The processor 190 controls the overall operation of the transport vehicle 110 according to the transport command of the upper controller (see 10 in FIG. 1).

The motion controller 170 may provide a position command to the driver 128 at preset intervals under the control of the processor 190.

The driver 128 generates a current for controlling the motor 124 connected to the driving wheel based on the position command.

The motor 124 controls an angular speed of the driving wheel by being connected to the driving wheel and changing a rotational speed according to the size of the current provided from the driver 128.

The encoder 126 measures the rotational speed of the motor 124. The encoder 126 provides the measurement result (i.e., an encoder signal) to the motion controller 170 and the driver 128. The motion controller 170 and the driver 128 may check the position of the transport vehicle 110 based on the encoder signal.

The communicator 160 may include a plurality of communication modules for communicating with a plurality of objects. For example, the communicator 160 may include a communication module for communicating with the upper controller OCS, a communication module for organizing an internal status of the transport vehicle 110 and reporting it to a diagnostic server, and a communication module for communicating with adjacent vehicles. Hereinafter, a communication method for communicating with adjacent vehicles is called vehicle to vehicle communication.

Meanwhile, a method in which the driver 128 controls the angular speed of the driving wheel, i.e., a method for generating the current for rotating the motor 124, may vary depending on the mode.

Hereinafter, the description is divided into cases in which the transport vehicle 110 is a master vehicle in a cooperative transport mode, is a slave vehicle in a cooperative transport mode, and is in a single transport mode. The upper controller 10 may instruct whether the transport vehicle 110 will operate in the single transport mode or the cooperative transport mode. In addition, the upper controller 10 may instruct whether the transport vehicle 110 is the master vehicle or the slave vehicle.

An operation of the case in which the transport vehicle 110 is the master vehicle in the cooperative transport mode will be described with reference to FIG. 5.

The upper controller (see 10 in FIG. 1) provides a cooperative transport command TD1. The cooperative transport command TD1 may include information such as a starting location (node A), a destination location (node B), and a transport target load (load C). In addition, the cooperative transport command TD1 may include a command indicating whether the transport vehicle 110 is the master vehicle or the slave vehicle. That is, the cooperative transport command TD1 includes information indicating that the transport vehicle 110 that received the cooperative transport command TD1 is the master vehicle. In addition, the cooperative transport command TD1 may include identification (ID) of another transport vehicle (i.e., the slave vehicle) that performs the cooperative transport command TD1.

The processor 190 generates a transport information command MC1 based on the cooperative transport command TD1. The transport information command MC1 may include additional information such as a maximum distance from the starting location to the destination location, a maximum speed of the transport vehicle, etc., in addition to information such as the starting location, the destination location, and the transport target load.

The motion controller 170 receives the transport information command MC1 and generates a position command PC1. The position command PC1 may be generated at preset intervals (e.g., 1 ms and 5 ms).

The driver 128 generates a torque command TC1 based on the position command PC1 and generates a first current I1 for rotation of the driving wheel based on the torque command TC1. The motor 124 is operated by the first current I1 and rotates the driving wheel connected to the motor 124.

The encoder 126 connected to the motor 124 measures the rotational speed of the motor 124 and feeds it back as an encoder signal R1. The encoder signal R1 is provided to the motion controller 170 and the driver 128. The motion controller 170 and the driver 128 may determine the position of the transport vehicle 110 based on the encoder signal R1. Accordingly, the motion controller 170 may perform an interlock of stopping the operation of the transport vehicle 110 by detecting an abnormal operation of the transport vehicle 110 (e.g., a movement path is different from a preset path, the transport vehicle moves too quickly, etc.).

In addition, the communicator 160 receives the torque command TC1 from the driver 128 and transmits the torque command TC1 to another transport vehicle (i.e., the slave vehicle) that will perform the cooperative transport command TD1. The communication with the slave vehicle may use vehicle-to-vehicle communication.

An operation of the case in which the transport vehicle 110 is the slave vehicle in the cooperative transport mode will be described with reference to FIG. 6.

The upper controller (see 10 in FIG. 1) provides a cooperative transport command TD2. The cooperative transport command TD2 may include information such as a starting location (node A), a destination location (node B), and a transport target load (load C). In addition, the cooperative transport command TD2 may include a command indicating whether the transport vehicle 110 is the master vehicle or the slave vehicle. That is, the cooperative transport command TD2 includes information indicating that the transport vehicle 110 that received the cooperative transport command TD2 is the slave vehicle. In addition, the cooperative transport command TD2 may include identification (ID) of another transport vehicle (i.e., the master vehicle) that performs the cooperative transport command TD2.

The communicator 160 receives a torque command TC2 from the master vehicle and transmits the torque command TC2 to the driver 128. The communication with the master vehicle may use vehicle-to-vehicle communication.

The driver 128 generates a second current I2 for rotation of the driving wheel based on the torque command TC2. The motor 124 is operated by the second current I2 and rotates the driving wheel connected to the motor 124.

The encoder 126 connected to the motor 124 measures the rotational speed of the motor 124 and feeds it back as an encoder signal R2. The encoder signal R2 is provided to the motion controller 170 and the driver 128. The motion controller 170 and the driver 128 may determine the position of the transport vehicle 110 based on the encoder signal R2. The motion controller 170 may perform an interlock for stopping the operation of the transport vehicle 110 by detecting an abnormal operation of the transport vehicle 110.

That is, when the transport vehicle 110 is the slave vehicle, the driver 128 generates the second current I2 based on the torque command TC2 provided from the master vehicle. The driver 128 does not internally perform position control or speed control.

An operation of the case in which the transport vehicle 110 is in the single transport mode will be described with reference to FIG. 7.

The upper controller (see 10 in FIG. 1) provides a single transport command TD3. The single transport command TD3 may include information such as a starting location (node A), a destination location (node B), and a transport target load (load C).

The processor 190 generates a transport information command MC3 based on the single transport command TD3. The transport information command MC3 may include additional information such as a maximum distance from the starting location to the destination location, a maximum speed of the transport vehicle, etc., in addition to information such as the starting location, the destination location, and the transport target load.

The motion controller 170 receives the transport information command MC3 and generates a position command PC3. The position command PC3 may be generated at preset intervals (e.g., 1 ms and 5 ms).

The driver 128 generates a torque command TC3 based on the position command PC3 and generates a third current I3 for rotation of the driving wheel based on the torque command TC3.

The motor 124 is operated by the third current I3 and rotates the driving wheel connected to the motor 124. The encoder 126 connected to the motor 124 measures the rotational speed of the motor 124 and feeds it back as an encoder signal R3. The encoder signal R3 is provided to the motion controller 170 and the driver 128. The motion controller 170 and the driver 128 may determine the position of the transport vehicle 110 based on the encoder signal R3. The motion controller 170 may perform an interlock for stopping the operation of the transport vehicle 110 by detecting an abnormal operation of the transport vehicle 110.

That is, when the transport vehicle 110 performs the single transport command TD3, there is no another transport vehicle 110 to cooperate. Therefore, there is no need to transmit the torque command TC3 to another transport vehicle 110.

Figure 8:
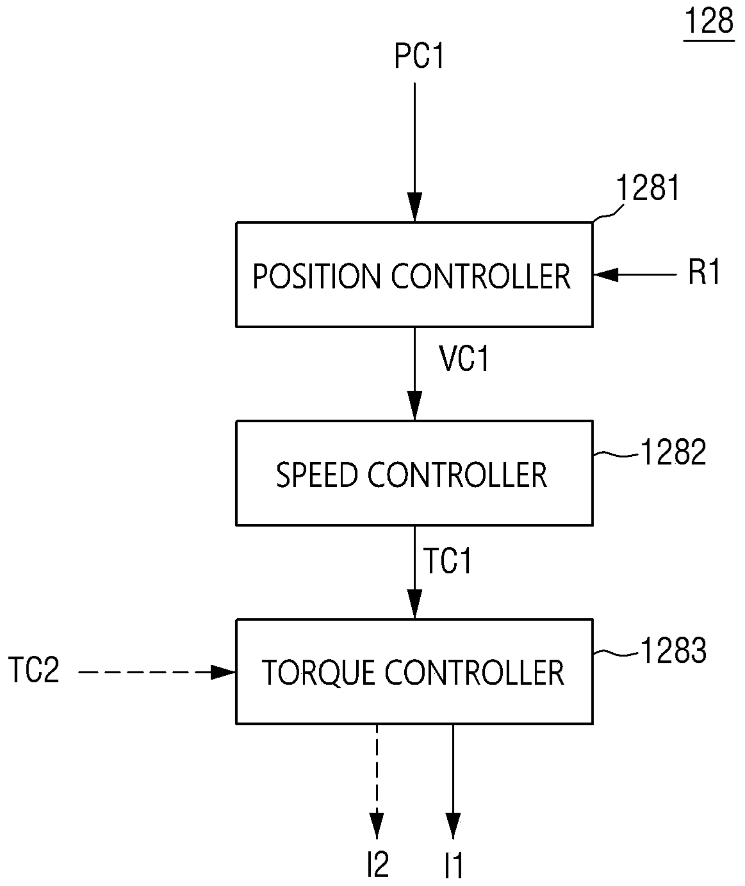
FIG. 8 is a block diagram for describing the driver of FIGS. 5 and 6.

FIG. 8 is a block diagram for describing the driver of FIGS. 5 and 6.

Referring to FIG. 8, the driver 128 includes a position controller 1281, a speed controller 1282, and a torque controller 1283.

The following is a description of the case in which the transport vehicle 110 is the master vehicle in the cooperative transport mode.

The position controller 1281 receives the position command PC1 and the encoder signal R1. The position controller 1281 determines the position of the transport vehicle 110 by using the encoder signal R1, and determines whether the position of the transport vehicle 110 is an appropriate position by comparing the determined position of the transport vehicle 110 with the position command PC1.

Specifically, if the position of the transport vehicle 110 matches a position designated by the position command PC1, the position controller 1281 maintains the speed of the transport vehicle 110. If the position of the transport vehicle 110 does not reach the position designated by the position command PC1, the position controller 1281 needs to increase the speed of the transport vehicle 110. If the position of the transport vehicle 110 passes the position designated by the position command PC1, the position controller 1281 needs to decrease the speed of the transport vehicle. Based on such a determination, the position controller 1281 generates a speed command VC1 for adjusting the speed of the transport vehicle 110.

The speed controller 1282 generates a torque command TC1 for adjusting an acceleration of the transport vehicle 110 based on the speed command VC1. That is, if the speed of the transport vehicle 110 needs to be increased, the angular acceleration of the driving wheel needs to be increased. Accordingly, the torque command TC1 is changed. Conversely, if the speed of the transport vehicle 110 needs to be decreased, the angular acceleration of the driving wheel needs to be decreased. Accordingly, the torque command TC1 is changed.

The torque controller 1283 receives a torque command TC1 and generates a first current I1 based on the torque command TC1. The first current I1 is transmitted to the motor 124.

When the transport vehicle 110 is the slave vehicle in the cooperative transport mode, the torque controller 1283 generates a second current I2 based on the torque command TC2 provided from the master vehicle.

When the master vehicle shares the position command PC1 or the speed command VC1 with the slave vehicle for cooperative transport, some of the torque generated from the slave vehicle during position control or speed control may interfere with the operation of the master vehicle. To prevent such interference, the master and slave vehicles share the torque command TC2.

Figure 9:
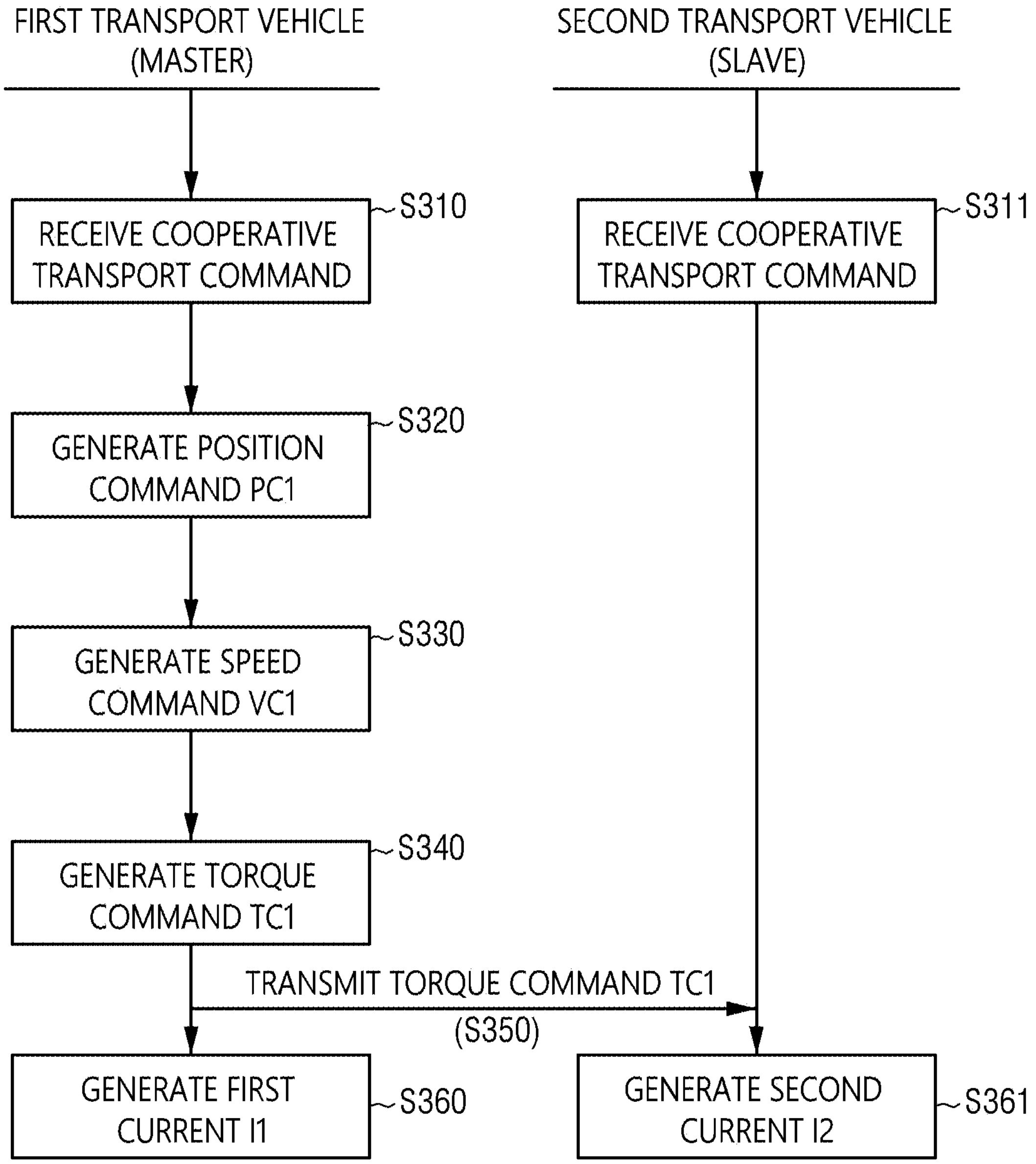
FIG. 9 is a flowchart for describing a method for operating a transport system according to some exemplary embodiments of the present disclosure.

FIG. 9 is a flowchart for describing a method for operating a transport system according to some exemplary embodiments of the present disclosure. For convenience of explanation, points different from those described with reference to FIGS. 4 to 8 will be mainly described.

Referring to FIGS. 8 and 9, a first transport vehicle (master vehicle) receives a cooperative transport command from an upper controller (S310). A second transport vehicle (slave vehicle) receives a cooperative transport command from the upper controller (S311). The cooperative transport command may include information indicating that the first transport vehicle is the master vehicle and the second transport vehicle is the slave vehicle.

Next, the first transport vehicle 110 generates a position command PC1 based on the cooperative transport command (S320).

Next, the first transport vehicle 110 generates a speed command VC1 based on the position command PC1 (S330).

Next, the first transport vehicle 110 generates a torque command TC1 based on the speed command VC1 (S340).

Next, the first transport vehicle 110 transmits the torque command TC1 the second transport vehicle (slave vehicle) (S350).

Next, the first transport vehicle 110 generates a first current I1 for rotation of a first driving wheel based on the torque command TC1 (S360). Next, the second transport vehicle generates a second current I2 for rotation of a second driving wheel based on the torque command TC1 (S361).

Figure 10:
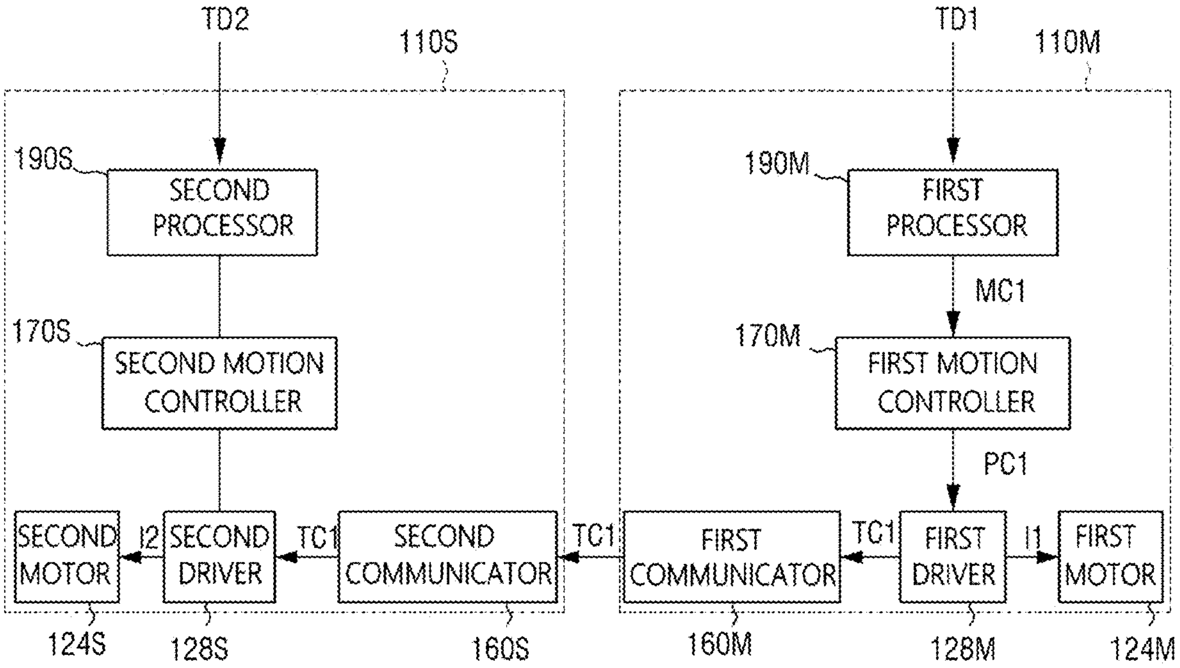
FIG. 10 is a block diagram for describing the method for operating a transport system according to some exemplary embodiments of the present disclosure.

FIG. 10 is a block diagram for describing the method for operating a transport system according to some exemplary embodiments of the present disclosure. For convenience of explanation, points different from those described with reference to FIGS. 4 to 9 will be mainly described.

A case in which a first transport vehicle 110M is a master vehicle and a second transport vehicle 110S is a slave vehicle will be described with reference to FIG. 10.

A first processor 190M of the first transport vehicle 110M generates a first transport information command MC1 based on the first cooperative transport command TD1.

A first motion controller 170M generates a first position command PC1 generated at preset time intervals based on the first transport information command MC1.

A first driver 128M generates a first torque command TC1 based on the first position command PC1 and generates a first current I1 based on the first torque command TC1. The first current I1 is transmitted to a first motor 124M to control a first driving wheel of the first transport vehicle 110M.

On the other hand, a second processor 190S of the second transport vehicle 110S may not generate a transport information command even if it receives the second cooperative transport command TD2. Similarly, a second motion controller 170S may not generate a position command.

Meanwhile, a first communicator 160M of the first transport vehicle 110M transmits the first torque command TC1 to a second communicator 160S of the second transport vehicle 110S.

A second driver 128S generates a second current I2 based on the first torque command TC1 received from the second communicator 160S. The second current I2 is transmitted to a second motor 124S to control a second driving wheel of the second transport vehicle 110S.

Figure 11:
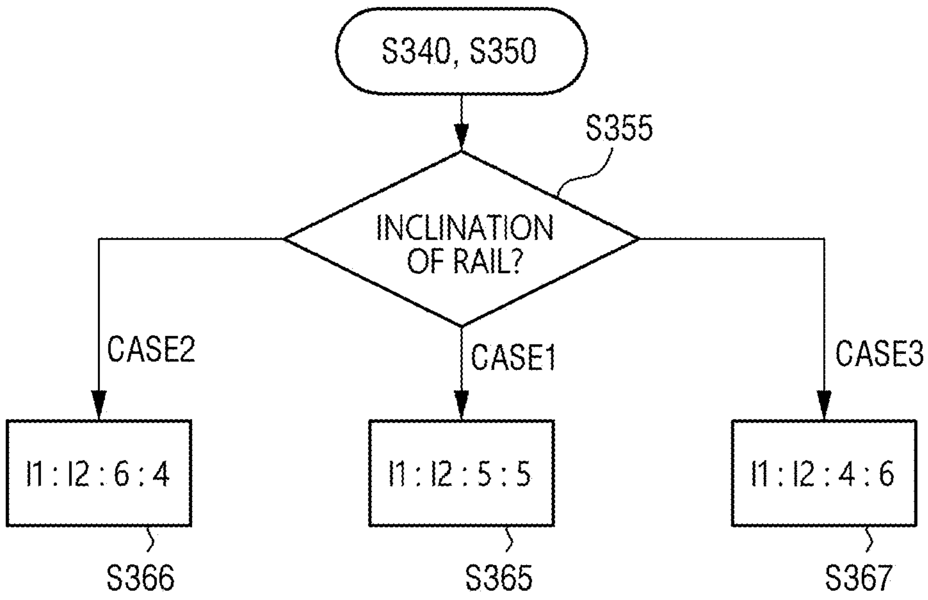
FIG. 11 is a flowchart for describing a method for operating a transport system according to some exemplary embodiments of the present disclosure.

FIG. 11 is a flowchart for describing a method for operating a transport system according to some exemplary embodiments of the present disclosure. For convenience of explanation, points different from those described with reference to FIGS. 4 to 10 will be mainly described.

The first current I1 generated in the first transport vehicle (master vehicle) by the torque command TC1 and the second current I2 generated in the second transport vehicle (slave vehicle) may or may not have the same magnitude. For example, the first current I1 and the second current I2 may vary depending on the inclination of the rail on which the first transport vehicle 110 and the second transport vehicle 110 pass.

Specifically, if the rail is flat (CASE1) as a result of checking the inclination of the rail (S355), the first current I1 and the second current I2 may have substantially the same magnitude (e.g., I1:I2=5:5) (S365).

If the rail is inclined in a first direction (CASE2), the first current I1 of the first transport vehicle positioned in the front may be greater than the second current I2 of the second transport vehicle positioned in the rear (e.g., I1:I2=6:4) (S366).

If the rail is inclined in a second direction (CASE3), the first current I1 of the first transport vehicle positioned in the front may be smaller than the second current I2 of the second transport vehicle positioned in the rear (e.g., I1:I2=4:4) (S367).

Figure 12:
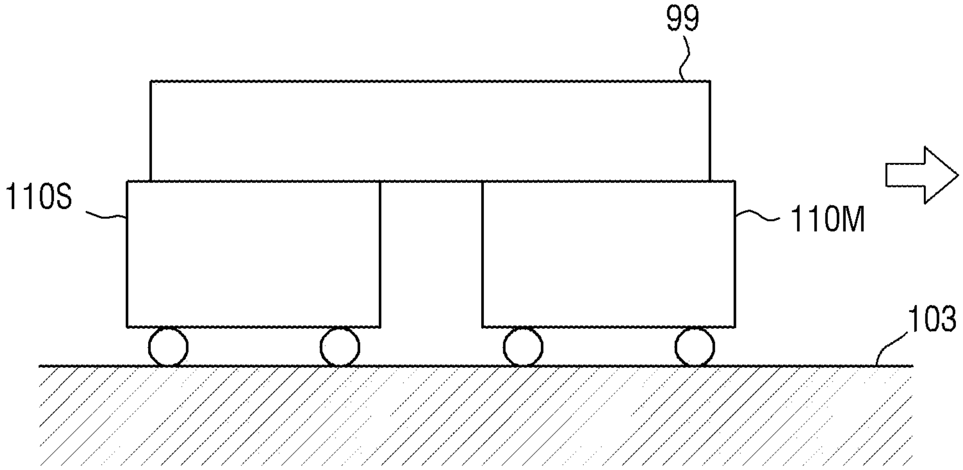
FIG. 12 is a diagram for describing another example of a plurality of transport vehicles transporting a heavy load.

FIG. 12 is a diagram for describing another example of a plurality of transport vehicles transporting a heavy load. For convenience of explanation, points different from those described with reference to FIGS. 1 to 11 will be mainly described.

Referring to FIG. 12, the transport vehicles 110M and 110S performing the cooperative transport may be an automated guided vehicle (AGV) or autonomous mobile robot (AMR) running on a floor (103) of the semiconductor manufacturing plant. The transport vehicle 110M generates a torque command, generates a current corresponding to the torque command, and transmits the torque command to another transport vehicle 110S (i.e., the slave vehicle). Another transport vehicle 110S generates a current corresponding to the torque command.

Although the exemplary embodiments of the present disclosure have been described with reference to the accompanying drawings, those of ordinary skill in the art to which the present disclosure pertains will understand that the present disclosure may be embodied in other specific forms without changing the technical spirit or essential features thereof. Therefore, it should be understood that the exemplary embodiments described above are illustrative in all aspects and not restrictive.

What is claimed is:

1. A transport system comprising:
  - a first transport vehicle including a first driving wheel and configured to move by rotation of the first driving wheel;
  - a second transport vehicle including a second driving wheel and configured to move by rotation of the second driving wheel; and
  - an upper controller controlling the first transport vehicle and the second transport vehicle,
  - wherein the upper controller provides a cooperative transport command to the first transport vehicle and the second transport vehicle,
  - the first transport vehicle generates a position command according to the cooperative transport command, generates a first torque command based on the position command, and controls the first driving wheel based on the first torque command,
  - the second transport vehicle receives the first torque command and controls the second driving wheel based on the first torque command, and
  - the first transport vehicle further includes a first motion controller that generates the position command at preset intervals, a first driver that generates the first torque command based on the position command, and a first communicator that transmits the first torque command to the second transport vehicle.

2. The transport system of claim 1, wherein the second transport vehicle does not receive the position command.

3. The transport system of claim 1, wherein the second transport vehicle receives the first torque command through vehicle to vehicle communication.

4. The transport system of claim 1, wherein the upper controller provides a command specifying that the first transport vehicle is a master vehicle and the second transport vehicle is a slave vehicle to the first transport vehicle and the second transport vehicle.

5. The transport system of claim 1, wherein the first driver further generates a first current for rotation of the first driving wheel based on the first torque command.

6. The transport system of claim 5, wherein the first driver is configured to:
  - receive a first encoder signal from a first encoder of a first motor that rotates the first driving wheel, generate a first speed command for adjusting a speed of the first transport vehicle based on the first encoder signal, and generate a first torque command for adjusting an acceleration of the first transport vehicle based on the first speed command, and the first current corresponds to the first torque command.

7. The transport system of claim 5, wherein the first motion controller is configured to:

receive a first encoder signal from a first encoder of a first motor that rotates the first driving wheel, and detect an abnormal operation of the first transport vehicle based on the first encoder signal and performs an interlock of stopping the operation of the first transport vehicle.

8. The transport system of claim 1, wherein the first transport vehicle generates a first current for rotation of the first driving wheel based on the first torque command, the second transport vehicle generates a second current for rotation of the second driving wheel based on the first torque command, and the ratio of the first current and the second current is different depending on an inclination of a rail on which the first transport vehicle and the second transport vehicle run.

9. A transport vehicle comprising:

a motion controller, a driver, a driving wheel, and a communicator, wherein in a first mode, the motion controller generates a position command, and the driver generates a first torque command based on the position command, and generates a first current for rotation of the driving wheel based on the first torque command, and in a second mode, the driver generates a second current for rotation of the first driving wheel based on a second torque command provided from the outside through the communicator.

10. The transport vehicle of claim 9, wherein the first mode is a single transport mode, and the second mode is a cooperative transport mode, the cooperative transport mode being a mode in which a master vehicle and a slave vehicle cooperatively transport a load.

11. The transport vehicle of claim 10, wherein in the second mode, the second torque command is received from a master vehicle.

12. The transport vehicle of claim 11, wherein in the second mode, the second torque command is received through vehicle to vehicle communication with the master vehicle.

13. The transport vehicle of claim 11, wherein in the second mode, a position command or a speed command is not received from the master vehicle.

14. The transport vehicle of claim 9, wherein the first mode corresponds to a case of a master vehicle in a cooperative transport mode, and the second mode corresponds to a case of a slave vehicle in the cooperative transport mode.

15. The transport vehicle of claim 9, further comprising a motor for rotating the driving wheel and an encoder of the motor, wherein the motion controller receives an encoder signal from the encoder and performs an interlock for stopping an operation of the transport vehicle based on the encoder signal.

16. A transport vehicle comprising:

a motion controller, a driver, a motor, a driving wheel, and a communicator, wherein the motion controller generates a position command at preset intervals, the driver receives an encoder signal from an encoder of the motor that rotates the driving wheel, the driver generates a speed command for changing a speed of the transport vehicle based on the encoder signal, the driver generates a torque command for changing an acceleration of the transport vehicle based on the speed command, the communicator transmits the torque command to a slave vehicle performing a cooperative transport together, and the driver generates a current corresponding to the torque command and rotates the driving wheel.

17. The transport vehicle of claim 16, wherein the communicator does not transmit the position command or the speed command to the slave vehicle.

18. The transport vehicle of claim 16, wherein the communicator provides the torque command to the slave vehicle through vehicle to vehicle communication.

19. The transport vehicle of claim 16, wherein the current is different depending on an inclination of a rail on which the transport vehicle runs.

20. The transport vehicle of claim 16, wherein the motion controller receives the encoder signal and performs an interlock for stopping an operation of the transport vehicle based on the encoder signal.

* * * * *